3,180,858
MOLECULAR WEIGHT CONTROL OF CIS-POLYISOPRENE
Ralph C. Farrar, Jr., Bartlesville, Okla., assignor to Phillips Petroleum Company, a corporation of Delaware
No Drawing. Filed Mar. 9, 1961, Ser. No. 94,440
10 Claims. (Cl. 260—94.3)

This invention relates to the preparation of cis-polyisoprene. In one aspect, the invention relates to a process for preparing a high molecular weight cis-polyisoprene. In another aspect, the invention relates to a process for controlling the molecular weight of cis-polyisoprene.

Several processes for preparing cis-polyisoprene have been recently described in the literature. In one of these processes, the cis-polymer is prepared by polymerizing isoprene (2-methyl-1,3-butadiene) in the presence of a catalyst comprising an organoaluminum compound and titanium tetrachloride. While the polymer prepared by this process contains a high percentage, e.g., 90 percent and higher, of cis 1,4-addition, the products frequently have a lower molecular weight than is desired. One method suggested for increasing the molecular weight is to decrease the catalyst level. However, this method has not proven to be entirely satisfactory since there is an accompanying decrease in reaction rate. Another difficulty encountered when attempting to polymerize isoprene to a high molecular weight polymer, for example, a polymer having an inherent viscosity of 3.0 to 4.0, is that the reaction mixture becomes highly viscous. This makes stirring of the reaction mixture extremely difficult or even impossible unless the reaction is terminated at a low conversion. The instant invention is concerned with a process for preparing a high molecular weight cis-polyisoprene, which overcomes the difficulties inherent in the prior art processes.

It is an object of this invention to provide a process for preparing a high molecular weight cis-polyisoprene. Another object of the invention is to provide a method for controlling the molecular weight of a cis-polyisoprene.

Other and further objects and advantages of the invention will become apparent to those skilled in the art upon consideration of the accompanying disclosure.

The present invention is concerned with an improvement in a process for polymerizing isoprene in the presence of a catalyst which forms on mixing components comprising an organo-aluminum compound and titanium tetrachloride. Broadly speaking, the improvement of this invention comprises the step of adding an alkali metal alcoholate or hydroxide to the reaction mixture obtained in the aforementioned polymerization. It has been discovered that the addition of the alkali metal compounds to the reaction mixture produces an unexpected effect in the molecular weight of the product. Thus, there is a very pronounced increase in molecular weight as evidenced by an increase in the inherent viscosity of the polymer. The magnitude of the effect varies with the amount of the alkali metal compound added to the reaction mixture. As a result, it is possible by proceeding in accordance with the present invention not only to increase the molecular weight of cis-polyisoprene but also to control the molecular weight of the polymer by regulating the amount of the alkali metal compound employed.

The alkali metal compounds which are added to the reaction mixture recovered from the polymerization are selected from the group consisting of alkali metal alcoholates and alkali metal hydroxides. The alkali metal alcoholates can be represented by the formula $MOR$, wherein M is an alkali metal, i.e., lithium, sodium, potassium, rubidium and cesium, and R is an alkyl, cyclo-alkyl, aryl, aralkyl, or alkaryl radical. The R radicals preferably contain from 1 to 20 carbon atoms. Examples of suitable R radicals include methyl, ethyl, n-propyl, isopropyl, tert-butyl, n-hexyl, dodecyl, tridecyl, eicosyl, cyclopentyl, cyclohexyl, methylcyclohexyl, benzyl, 4-tolyl, 2,4,6-trimethylphenyl, 4-tert-butylphenyl, 2-decylphenyl, 4-dodecylphenyl, 2,4-diheptylphenyl, 2-phenylethyl, 14-phenyltetradecyl, 5,8-diphenyloctyl, 1-napththyl, and 2-naphthyl. Any of the alkali metal hydroxides can be used in the practice of the process. It is usually preferred to use the lithium, sodium or potassium hydroxides. The amount of the alkali metal compound employed is, in general, governed by the inherent viscosity desired in the product and upon the catalyst level employed in the polymerization. The amount can be conveniently expressed in terms of the aluminum present in the catalyst system. Thus, the amount is usually in the range of 0.2 to 8 mols, preferably 1 to 6 mols, of the alkali metal compound per gram atom of aluminum. In any event, the amount of the alkali metal compound added must be sufficient to render the system basic.

As mentioned previously, the catalyst used in the polymerization of isoprene according to this invention can be formed by mixing components comprising an organoaluminum compound and titanium tetrachloride. The organoaluminum compound can be represented by the formula $R'_3Al$, wherein $R'$ is an alkyl, cycloalkyl, aryl, aralkyl or alkaryl radical. The $R'$ radicals preferably contain from 1 to 20 carbon atoms. Examples of compounds corresponding to the aforementioned formula which can be used include trimethylaluminum, triethylaluminum, triisobutylaluminum, tri-n-butylaluminum, tri-n-pentylaluminum, triisooctylaluminum, tri-n-dodecylaluminum, tri-n-heptadecylaluminum, triisoeicosylaluminum, tribenzylaluminum, triphenylaluminum, trinaphthylaluminum, tri-p-tolylaluminum, tricyclohexyl-aluminum, tri(4-methylcyclohexyl)aluminum, tri(4-butylcyclohexyl)aluminum, tri(4-cyclohexylbutyl)aluminum, and the like.

The amount of titanium tetrachloride used in the catalyst system is usually in the range of 0.2 to 20 mols per mol of the organoaluminum compound. However, a preferred ratio is from 0.33 to 10 mols of the titanium tetrachloride per mol of the organoaluminum compound. It has been found that greatly increased yields of the cis-polyisoprene are obtained when using a catalyst composition falling within the preferred ratio.

The amount of the catalyt composition which is used in the polymerization can vary over a rather wide range. The concentration of the total catalyst composition is usually in the range of about 0.5 weight percent to 15.0 weight percent or higher, based on the amount of isoprene charged to the polymerization reactor. When operating in accordance with the present invention, the catalyst level can be high enough to give a good conversion rate, and the reaction can be carried to a high conversion in a relatively short time, e.g., 90 percent or higher in from 2 to 5 hours. The reaction mixture as recovered from the polymerization zone is of a lower viscosity than that obtained when operating at low catalyst levels and is, therefore, easier to handle. Addition of the alkali metal compound to the reaction mixture brings the inherent viscosity of the product within the desired range. Thus, a cis-polyisoprene having an inherent viscosity of 5 and higher is produced. This inherent viscosity is considerably greater than that ordinarily obtained when employing the present catalyst system.

The polymerization process of this invention can be carried out over a relatively wide range of temperatures, e.g., in the range of $-100°$ F. to $500°$ F. It is usually preferred to operate at a temperature in the range of $-100°$ F. to $212°$ F., and more desirably at a temperature in the range of $-14°$ F. to $122°$ F. It is preferred to conduct the polymerization in the presence of an inert, hydrocarbon diluent, although the polymerization can be carried out without the use of such a diluent. The polymerization reaction can be conducted under autogenous pressures. It is usually desirable to operate at pressures sufficient to maintain the isoprene substantially in the liquid phase. The pressure will thus depend upon the particular material employed as the diluent and the temperature at which the polymerization is conducted. However, higher pressures can be employed if desired, these pressures being obtained by some such suitable method as the pressurization of the reactor with a gas which is inert with respect to the polymerization reaction.

Diluents suitable for use in the polymerization process are paraffins, cycloparaffins and/or aromatic hydrocarbons wihch are relatively inert, non-deleterious and liquid under the reaction conditions of the process. Examples of such diluents include propane, butane, pentane, hexane, cyclohexane, methylcyclohexane, benzene, toluene, the xylenes, and the like. It is to be understood that mixtures of these materials can be used as diluents. The relative amounts of diluent and isoprene employed in the polymerization depend upon the particular conditions and techniques used and are generally governed by the capacity of the apparatus to effect suitable agitation and heat removal. The polymerization process can be conducted as a batch process by charging the isoprene into a reactor containing catalyst and diluent, or the process can be carried out continuously by maintaining the above-mentioned concentrations of reactants in the reactor for a suitable residence time. The residence time in a continuous process will, of course, vary within rather wide limits depending upon such variables as temperature, pressure, the catalyst system used, and the like. In a continuous process, the residence time will generally fall within the range of 1 second to 1 hour when conditions within the specified ranges are employed. When a batch process is being used, the time for the reaction can be as high as 24 hours or more.

It has been found that various materials may in some instances have a tendency to inactivate the organoaluminum-titanium tetrachloride catalyst system. These materials include carbon dioxide, oxygen and water. It is usually desirable, therefore, to free the isoprene to be polymerized from these materials as well as from other materials which may tend to inactivate the catalyst before contacting the isoprene with the catalyst. Any of the known means for removing such contaminants can be employed. Furthermore, the hydrocarbon diluent employed in the process should also be free of contaminants, such as oxygen, water and the like. It is desirable also that air and moisture be removed from the reaction vessel before the reaction is carried out. This is usually accomplished by purging with an inert gas such as nitrogen. In some cases, small amounts of catalyst-inactivating materials, such as oxygen and water, can be tolerated in the reaction mixture while still obtaining reasonably good polymerization rates. It is to be understood, however, that the amount of such materials present in the reaction mixture shall not be sufficient to completely inactivate the catalyst.

Several procedures can be followed in adding the alkali metal alcoholate or hydroxide to the reaction mixture obtained from the polymerization. The alkali metal compounds are usually added as a solution in a suitable solvent. Thus, they can be dissolved either in a hydrocarbon solvent, preferably similar to the hydrocarbon used as a diluent, or in an alcohol. It is usually preferred to dissolve the compound in an alcohol, such as ethyl alcohol or isopropyl alcohol, since the compounds are usually more soluble in alcohols. If the alkali metal compound is dissolved in a hydrocarbon, the resulting solution can be added prior to or subsequent to termination of the polymerization reaction. If the alkali metal compound is dissolved in an alcohol, the alcohol can function also as a means for terminating the reaction. Alternatively, the alcoholic solution can be added subsequent to the termination of the reaction. The polymerization reaction can be terminated by the addition of an amount of a catalyst-inactivating material, such as an alcohol, which is sufficient to inactivate the catalyst without causing precipitation of the polymer.

After addition of the alkali metal alcoholate or hydroxide and after termination of the polymerization reaction, an antioxidant is added to the system. Examples of suitable antioxidants include 2,2'-methylene-bis(4-methyl-6-tert-butylphenol) and phenyl-beta-naphthylamine. The polyisoprene is then recovered from solution by any suitable means. In one suitable method, an alcohol is added in order to precipitate the polymer. In another suitable method, the polymer is recovered by steam stripping the diluent from the reaction mixture. The precipitated polymer is then separated from the diluent or water by decantation, filtration or other suitable means, after which the polymer is dried. The diluent and treating agents can be separated by any suitable means, e.g., by fractional distillation, and reused in the process.

A more complete understanding of the invention can be obtained by referring to the following illustrative examples which are not intended, however, to be unduly limitative of the invention.

EXAMPLE

A series or runs was conducted in which isoprene was polymerized with a catalyst formed from triisobutylaluminum and titanium tetrachloride. The following recipe was employed in these runs:

*Recipe*

| | |
|---|---|
| Isoprene | 100 parts by weight. |
| n-Heptane | 340 parts by weight. |
| Triisobutylaluminum | 0.99 parts by weight (5.0 mmole). |
| Titanium tetrachloride | 0.95 parts by weight (5.0 mmole). |
| Temperature, °F. | 41 (5° C.). |
| Time, hours | 21. |

The procedure followed in each of the runs was to charge the n-heptane first to the reactor. The reactor was then purged with nitrogen after which the isoprene, triisobutylaluminum, and titanium tetrachloride were introduced in that order. The triisobutylaluminum was added as an 0.42 molar solution in n-heptane while the titanium tetrachloride was charged as an 0.294 molar solution in n-heptane.

At the conclusion of the polymerizations, variable quantities of lithium isopropoxide (lithium isopropylate) were added to the reaction mixtures. After about 5 minutes, 10 cc. of isopropyl alcohol and 2 parts by weight (based on the monomer charged) of the antioxidant 2,2'-methylene-bis(4-methyl-6-tert-butylphenol) were added to each reaction mixture. The polymer, which was coagulated by the addition of isopropyl alcohol, was dried in a vacuum oven at 60° C. The results of the runs are shown below in the table.

TABLE

| Run No. | Lithium isopropoxide, mhm[1] | Conversion, percent | Inherent viscosity | Gel, percent |
|---|---|---|---|---|
| 1 | 2.5 | 52 | 3.47 | 14 |
| 2 | 5.0 | 50 | 3.47 | 13 |
| 3 | 10.0 | 47 | 3.72 | 15 |
| 4 | 20.0 | 46 | 5.86 | 27 |
| 5 | 30.0 | 50 | 5.37 | 26 |
| 6 | 0 | 54 | 3.02 | 12 |

[1] Millimols per 100 grams monomer.

The lithium isopropoxide was used as a solution in n-heptane and was prepared by adding 2.5 cc. (1.962 grams) of isopropyl alcohol to 44.0 grams of n-heptane followed by 28 cc. of a 1.17 molar solution of n-butyllithium. The mixture was allowed to stand 1.5 hours before use. The concentration was calculated to be 0.345 molar.

The data in the foregoing table demonstrate that addition of the alkali metal compound increased the inherent viscosity (molecular weight) of the polyisoprene product. Furthermore, the data show that by varying the amount of the alkali metal compound added, it was possible to vary the inherent viscosities. It is thus seen that the present invention provides a method for controlling the molecular weight of polyisoprene.

It will be apparent to those skilled in the art that many variations and modifications of the invention can be made upon study of the foregoing disclosure. Such variations and modifications are believed to come within the spirit and scope of the invention.

I claim:

1. In a process for polymerizing isoprene which comprises contacting isoprene under polymerization conditions with a catalyst which forms on mixing components comprising a compound having the formula $R'_3Al$, wherein $R'$ is selected from the group consisting of alkyl, cycloalkyl, aryl, aralkyl and alkaryl radicals, and titanium tetrachloride, said contacting occurring in a hydrocarbon diluent and for a period of time sufficient to form a reaction mixture containing a solution of polyisoprene, the improvement which comprises increasing the inherent viscosity of said polyisoprene by adding to said reaction mixture an alcoholate having the formula MOR, wherein M is an alkali metal and R is selected from the group consisting of alkyl, cycloalkyl, aryl, aralkyl and alkaryl radicals having 1 to 20 carbon atoms, and thereafter precipitating the polyisoprene.

2. The process according to claim 1 in which said alcoholate is lithium isopropoxide.

3. The process according to claim 1 in which said alcoholate is lithium ethoxide.

4. The process according to claim 1 in which said alcoholate is sodium tert-butoxide.

5. The process according to claim 1 in which said alcoholate is potassium methoxide.

6. In a process for polymerizing isoprene which comprises contacting isoprene at a temperature in the range of $-100°$ F. to $500°$ F. and under autogenous pressure with a catalyst which forms on mixing components comprising a compound having the formula $R'_3Al$, wherein $R'$ is selected from the group consisting of alkyl, cycloalkyl, aryl, aralkyl and alkaryl radicals, and titanium tetrachloride, the concentration of said catalyst being in the range of 0.5 to 15.0 weight percent, based on said isoprene, and the amount of said titanium tetrachloride being in the range of 0.2 to 20 mols per mol of said $R'_3Al$ compound, and said contacting occurring in a hydrocarbon diluent and for a period of time sufficient to form a reaction mixture containing a solution of polyisoprene, the improvement which comprises increasing the inherent viscosity of said polyisoprene by adding to said reaction mixture an alcoholate having the formula MOR, wherein M is an alkali metal and R is selected from the group consisting of alkyl, cycloalkyl, aryl, aralkyl and alkaryl radicals having 1 to 20 carbon atoms, said alcoholate being added as a solution in a solvent and the amount of said alcoholate added being in the range of 0.2 to 8 mols per gram atom of aluminum present in said catalyst; thereafter precipitating the polyisoprene, and recovering a polyisoprene of increased inherent viscosity.

7. The process according to claim 6 in which said solvent is selected from the group consisting of hydrocarbons and alcohols.

8. The process according to claim 6 in which an antioxidant is added to said reaction mixture after addition of said alcoholate; said polyisoprene is precipitated from solution by addition of an alcohol; and said precipitated polyisoprene is then separated from said reaction mixture.

9. The process according to claim 6 in which the amount of said alcoholate added to said reaction mixture is varied so as to control the inherent viscosity of said recovered polyisoprene.

10. In a process for polymerizing isoprene which comprises contacting isoprene at a temperature in the range of $-14$ to $122°$ F. under autogenous pressure with a catalyst which forms on mixing triisobutyl-aluminum and titanium tetrachloride in a ratio of 0.1 to 3.0 mols of triisobutylaluminum per mol of titanium tetrachloride, the concentration of said catalyst being in the range of 0.5 to 15.0 weight percent, based on said isoprene, and said contacting occurring in a hydrocarbon diluent for a period of time sufficient to form a reaction mixture containing a solution of polyisoprene, the improvement which comprises increasing the inherent viscosity of said polyisoprene by adding lithium isopropoxide to said reaction mixtrue, said lithium isopropoxide being added as a solution in a solvent and the amount added being in the range of 0.2 to 8 mols per gram atom of aluminum in said catalyst, and then adding as an antioxidant 2,2'-methylene-bis(4-methyl-6-tert-butylphenol) and coagulating and recovering the polyisoprene.

References Cited by the Examiner

UNITED STATES PATENTS

| | | | |
|---|---|---|---|
| 2,900,373 | 8/59 | Martin | 260—94.9 |
| 2,956,993 | 10/60 | Nowlin et al. | 260—94.9 |
| 2,962,488 | 11/60 | Horne | 260—94.7 |
| 2,970,134 | 1/61 | Anderson | 260—94.3 |

JOSEPH L. SCHOFER, *Primary Examiner.*

L. H. GASTON, WILLIAM H. SHORT, *Examiners.*